US009421910B1

United States Patent
Waltermann et al.

(10) Patent No.: US 9,421,910 B1
(45) Date of Patent: Aug. 23, 2016

(54) IDENTIFYING ROAD HAZARDS (71) Applicant: Lenovo (Singapore) Pte. Ltd., Singapore (SG)

(72) Inventors: Rod D. Waltermann, Rougemont, NC (US); Michael D. Anderson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/672,932

(22) Filed: Mar. 30, 2015

(51) Int. Cl.
*B60Q 1/26* (2006.01)
*B60Q 9/00* (2006.01)
*B60Q 1/24* (2006.01)

(52) U.S. Cl.
CPC .............. *B60Q 9/008* (2013.01); *B60Q 1/24* (2013.01)

(58) Field of Classification Search
CPC ........................................ B60Q 9/008
USPC ............................... 340/903, 435
See application file for complete search history.

(56) References Cited

U.S. PATENT DOCUMENTS

| 6,281,806 B1* | 8/2001 | Smith et al. .................. 340/901 |
| 7,782,184 B2* | 8/2010 | Wittorf et al. ................ 340/468 |
| 9,037,343 B2* | 5/2015 | Aimura ......................... 340/937 |
| 2011/0068910 A1* | 3/2011 | Iwai ...................... B60Q 1/085 340/435 |
| 2015/0252974 A1* | 9/2015 | Hu ...................... F21S 48/1225 362/510 |

OTHER PUBLICATIONS

Parker, "How Laser-powered Headlights Work," HowStuffWorks, Nov. 2011, 3 pages.

* cited by examiner

*Primary Examiner* — Brent Swarthout
(74) *Attorney, Agent, or Firm* — VanLeeuwen & VanLeeuwen; Carlos Munoz-Bustamante (57) ABSTRACT

An approach is provided for identifying, from a moving vehicle, an object proximate to a direction of the moving vehicle. The identified object is illuminated with a colored laser light with the colored laser light emanating from a laser included in the vehicle.

20 Claims, 5 Drawing Sheets

IDENTIFYING ROAD HAZARDS

BACKGROUND

Laser powered headlights on vehicles are becoming increasingly popular. Laser headlights are more powerful, more efficient, and smaller than traditional types of headlamps. Laser headlights are modulated for safety as not to damage objects that they illuminate, such as other vehicles on the roadway. Laser headlights now on the market are converted to a pure white light that is visually pleasing for both the driver of the vehicle with the laser headlights as well as to other drivers on the road.

Technology, such as infrared sensors, detect animals or people near the roadway. Current approaches sound an alarm and can provide a visible warning on the vehicle's heads-up display, both of which can be distracting to the driver. The highlighted image of the animal or person appears on a video screen in the vehicle which is not in the driver's normal line of sight, so it can be difficult, and rather distracting, for the driver to ascertain exactly where the animal or person with respect to the roadway. Given the speed of the vehicle and a person's average reaction time, these difficulties and distractions could lead to a dangerous situation or accident.

SUMMARY

An approach is provided for identifying, from a moving vehicle, an object proximate to a direction of the moving vehicle. The identified object is illuminated with a colored laser light with the colored laser light emanating from a laser included in the vehicle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
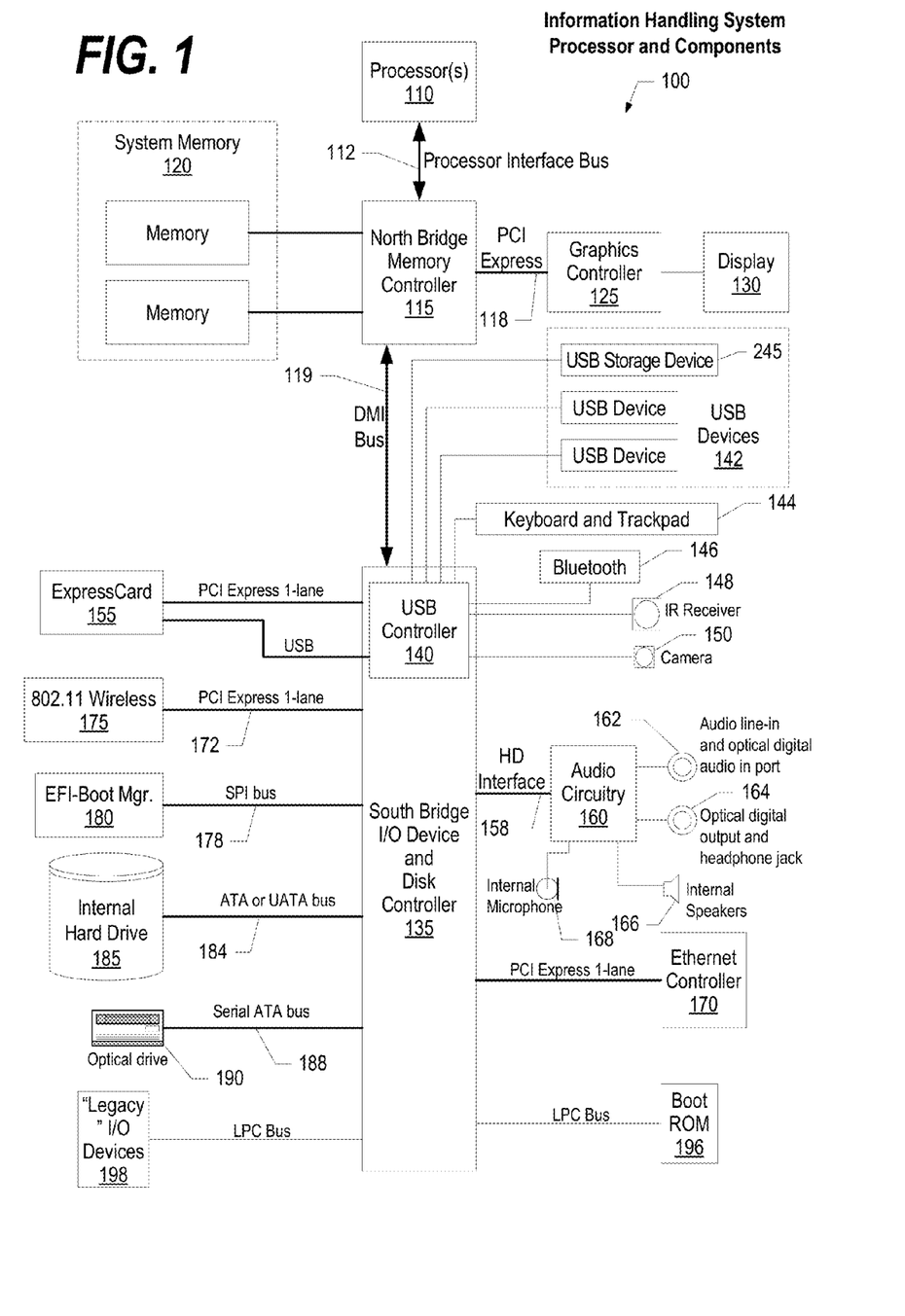
FIG. 1 is a block diagram of a data processing system in which the methods described herein can be implemented.
Figure 2:
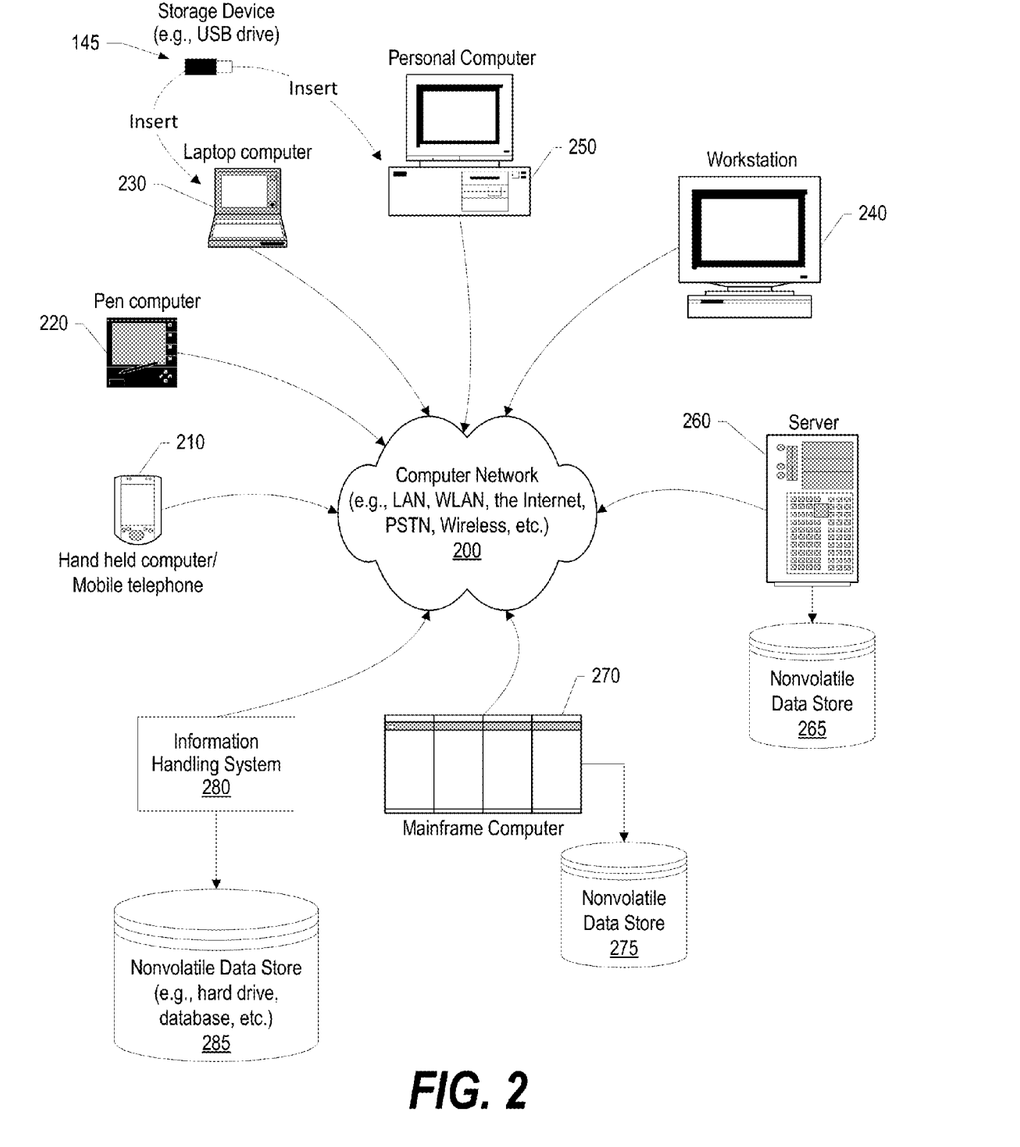
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
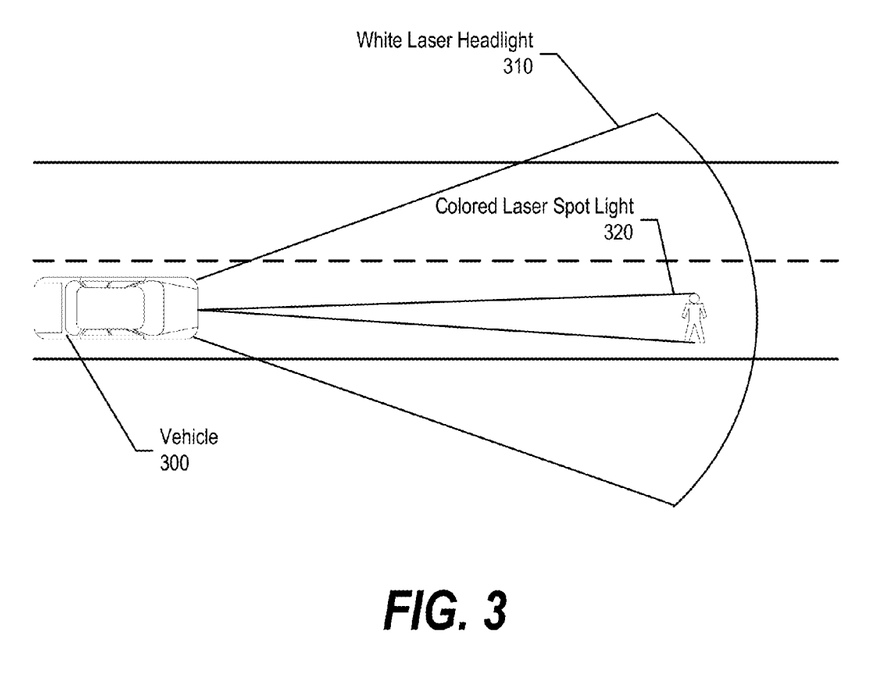
FIG. 3 is a roadway diagram depicting two sets of laser headlights—one that illuminates the roadway with white light and another that illuminates an object with a colored laser light.

FIG. 3 is a roadway diagram depicting two sets of laser headlights—one that illuminates the roadway with a broad-spectrum light and another that illuminates an object with a colored laser light. Vehicle 300 is equipped with headlights, such as laser headlights, LED headlights, halogen headlights, etc., that are broad-spectrum in color. These headlights illuminate the direction of the vehicle. In the example shown in FIG. 3, the vehicle is traveling on a roadway and white laser headlight 310 illuminates the roadway by casting a white light on the roadway and proximate to the roadway.

In one embodiment, a laser light passes through a broad-spectrum phosphorous material to create broad-spectrum light from the laser.

Sensors in vehicle 300, such as infrared sensors, laser-based sensors, and radar-based sensors are used to detect objects on or near the anticipated path of the vehicle given the vehicle's current direction. Identification of other moving vehicles can be performed by detecting a speed of the object in relation to moving vehicle 300. For example, an abandoned or broken-down vehicle on or proximate to the roadway would be found to have no speed so would be detected as an object of which the driver of the vehicle should be alerted. Likewise, people and animals near the roadway would be found to have different speeds and directions in comparison as well as exhibit an infrared signature indicating that these objects are animate objects, rather than inanimate objects. Differentiating between objects to avoid, such as people, animals, stopped vehicles, and other objects, and other vehicles traveling on the roadway, either the same direction or in the other lane in the opposite direction, allow highlighting of objects to be avoided rather than highlighting other vehicles that are expected to be on the same roadway.

The approach described herein uses an additional laser that is of a different color to outline the object recognized by the vehicle's sensors. As shown in FIG. 3, colored laser light 320 is used to illuminate an identified object found to be proximate to the direction of the vehicle. By directly outlining the object with a colored laser light, the approach draws attention to the object, without interfering with any other areas of the road. Additionally, because the colored laser light is actually outlining the object, the approach can also assist drivers of other vehicles on the roadway by highlighting the object for them.

In one embodiment, the color of the laser that is directed at the object is created by passing the laser light through a colored phosphorous material. In addition, because the approach uses an infrared sensor to differentiate between animate and inanimate objects, one color, such as red, can be used to highlight animate objects while another color, such as blue, can be used to highlight inanimate objects.

Figure 4:
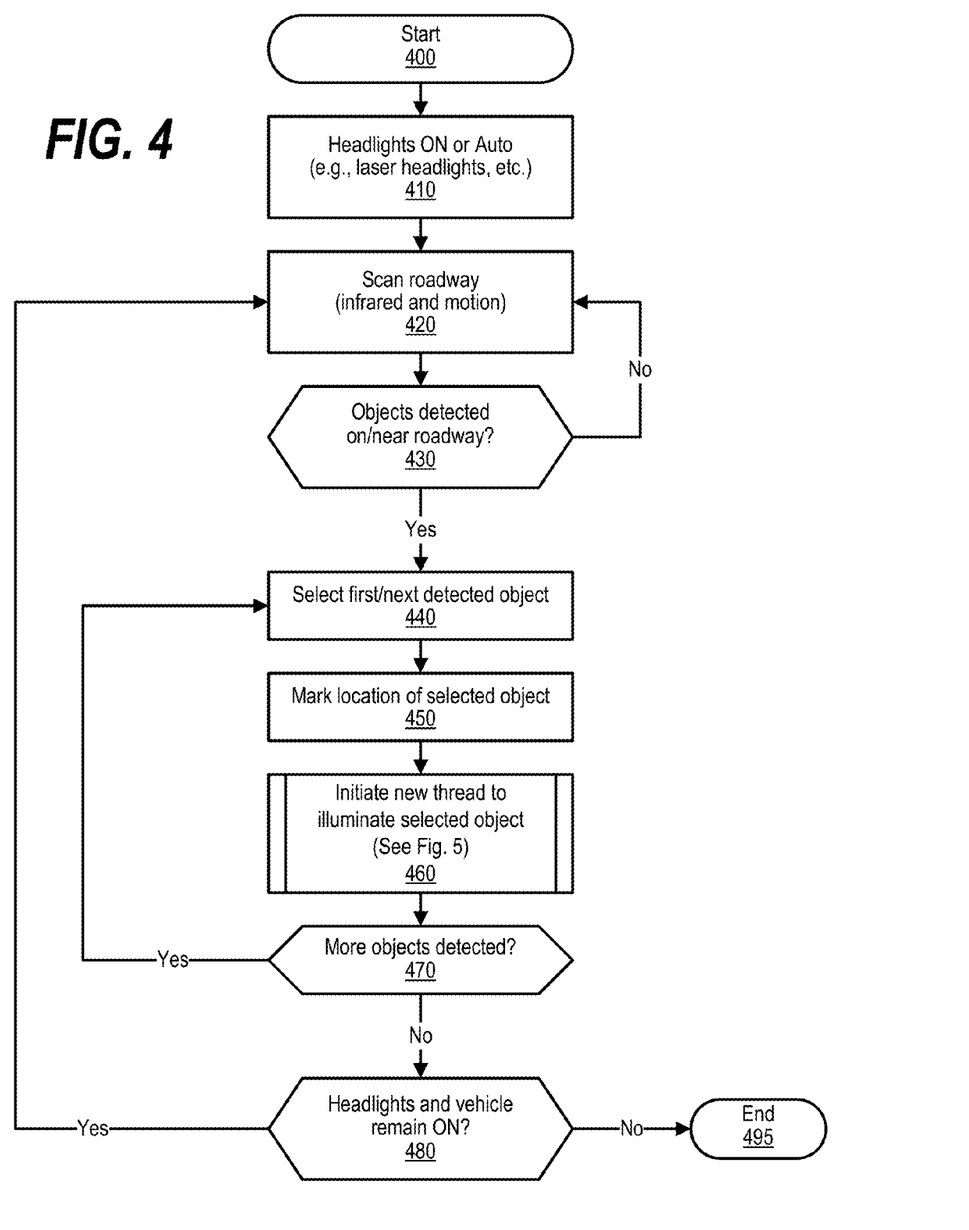
FIG. 4 is a flowchart showing steps taken to scan a roadway and identify objects in or near the roadway while laser headlights are in use.

FIG. 4 is a flowchart showing steps taken to scan a roadway and identify objects in or near the roadway while laser headlights are in use. FIG. 4 commences at 400 and shows the steps taken by a process that highlights objects proximate to a vehicle's direction of travel using colored laser lights. At step 410, the process operates when the vehicle's laser-based headlights are ON or otherwise engaged through use of an "Auto" setting. In addition, in one embodiment, the vehicle laser headlights and object detection technologies discussed herein are automatically engaged, or turned "ON", when either an object is detected on or near the roadway or as part of the vehicle's collision avoidance system. For example, a radar or other object detection technology installed in the vehicle can always be engaged and, when an object is detected proximate to the roadway, then the vehicle's laser headlights are automatically turned ON and a colored laser light is directed at the object to highlight the object for the driver of the vehicle.

Vehicle sensors used to detect objects might include multidimensional automatic target recognition (ATR) system; human, or animal, motion detection systems, and a framework that uses mathematical functions and algorithms to detection moving objects in relation to a moving vehicle in order to determine if the object is anticipated to be in or near the path If the vehicle.

Installed sensor hardware in the vehicle enables detection of virtually everything around the vehicle and determine whether a detected object is proximate to the path of the vehicle, and thus a possible danger to the driver. In addition, the sensor hardware detects whether an object is animate or inanimate. The sensor platform in the vehicle may include radar, ultrasonic sensors, infrared (IR) detectors, Lidar-detectors, and cameras. The vehicle uses ultrasonic sensors to provide proximity detection for low-speed events, such as parallel parking and low-speed collision avoidance. Infrared (IR) detectors can be used to detect heat from an object, and consequently whether an object is likely an animate object, such as a person or an animal, or an inanimate object, such as a box or a stalled car alongside the roadway.

Radar detectors operate using short-, medium-, and long-range capabilities. Thus, radar can be used to detect objects proximate to the vehicle somewhat close to the vehicle as well as objects far ahead of the vehicle. Detecting and highlighting an object when it is further away from the vehicle allows the driver, or collision avoidance system, of the vehicle more time to avoid the object as the system continues to highlight and track the object as it becomes closer to the vehicle.

IR (infrared) LEDs and photosensors detection of animate objects. In one embodiment, the vehicle's animate object detectors include cameras that use IR LEDs rather than those in the visible spectrum so that the detectors can operate in the dark, such as at nighttime. Some IR sensors can detect objects beyond what can be illuminated by the vehicles headlights. Consequently, IR detectors can detect objects, such as animals in the roadway, before such objects are even visible to the driver.

Laser-based detectors track objects using observations of a 1D projection of objects in an observable space, such as the space in which the vehicle is heading. Laser-based detectors detect the range to objects in small intervals over an arc. Range measurements provided by laser-based detectors highly accurate and are useful in detecting the proximity of objects to the path of the vehicle and the distance of such objects from the vehicle.

At step 420, the process scans in the direction of the moving vehicle, such as ahead of the vehicle on and beside a roadway in which the vehicle is traveling. As described in FIG. 3, a variety of scanning technology can be used including collision-detection, or avoidance, technology that utilizes laser-based and radar-based sensors that scan for objects as well as infrared sensors that scan for heat signatures produced by animate objects.

The process determines as to whether any objects were detected proximate to the vehicle's direction of travel, such as objects proximate to a roadway (decision 430). If any objects were detected proximate to the vehicle's direction of travel, then decision 430 branches to the 'yes' branch to perform steps 440 through 470 to highlight the detected objects using colored laser lights. On the other hand, if no objects were detected proximate to the vehicle's direction of travel, then decision 430 branches to the 'no' branch which loops back to step 420 to continue scanning the roadway as the vehicle travels.

At step 440, the process selects the first detected object. At step 450, the process marks the current location of the selected object. At predefined process 460, the process performs a routine that initiates a new processing thread that tracks and illuminate the selected object (see FIG. 5 and corresponding text for processing details).

The process determines as to whether there were more objects that were detected in step 420 (decision 470). If there were more objects that were detected, then decision 470 branches to the 'yes' branch which loops back to select and illuminate the next object. This looping continues until all of the objects that were detected have been processed, at which point decision 470 branches to the 'no' branch exiting the loop.

The process determines as to whether the vehicle's headlights and the vehicle remain ON (decision 480). If the vehicle's headlights and the vehicle remain ON, then decision 480 branches to the 'yes' branch which loops back to continue scanning the area in the direction that the vehicle is traveling for additional objects to highlight using the laser lights. This scanning continues until the vehicle's headlights or the vehicle are turned OFF, at which point decision 480 branches to the 'no' branch and processing ends at 495.

Figure 5:
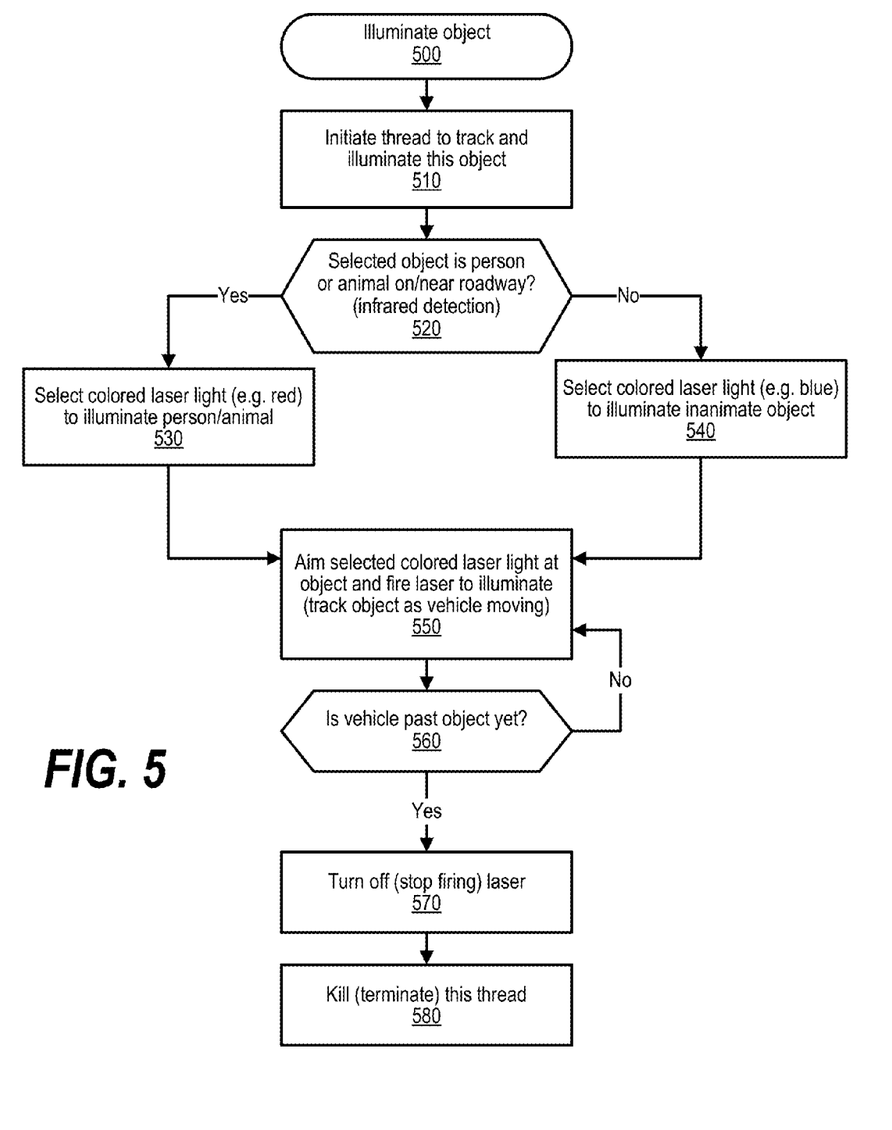
FIG. 5 is a flowchart showing steps taken to initiate a new thread that tracks and illuminates a detected object using a colored laser light.

FIG. 5 is a flowchart showing steps taken to initiate a new thread that tracks and illuminates a detected object using a colored laser light. FIG. 5 commences at 500 and shows the steps taken by a process that illuminates an object that was detected proximate to a direction of the moving vehicle. At step 510, the process initiates a processing thread that tracks and illuminates this object.

The process determines as to whether the selected object is an animate object (e.g., a person, animal, etc.) or an inanimate object (decision 520) using an animate object detector. In one embodiment, the animate object detector an infrared sensor is used to distinguish between animate and inanimate objects. In another embodiment, the animate object detector using inputs from sensors, such as laser-based sensors, to detect and determine the movement of an object and whether the object's movement represent an animate objects, such as a person or an animal, or an inanimate object, such as another vehicle or an object being blown by the wind, etc. If the selected object is an animate object proximate the direction that the vehicle is moving, then decision 520 branches to the 'yes' branch whereupon, at step 530, the process selects a colored laser light (e.g., red, etc.) that is used to illuminate animate objects. On the other hand, the selected object is an inanimate object proximate the direction that the vehicle is moving, then decision 520 branches to the 'no' branch whereupon, at step 540, the process selects a colored laser light (e.g., blue, etc.) that is used to illuminate inanimate objects.

At step 550, the process aims the selected colored laser light (e.g., red or blue, etc.) at the detected object and fires the laser at the object to illuminate the object. The processing thread tracks the object in relation to the moving vehicle. The process determines as to whether the identified object is at a safe position from the path of the moving vehicle, such as when the vehicle passes the object (decision 560). If the identified object is not yet at a safe position from the path of the moving vehicle, then decision 560 branches to the 'no' branch which loops back to continue tracking and illuminating the identified object using the selected colored laser light. This looping continues until the identified object is at a safe position from the path of the moving vehicle, at which point decision 560 branches to the 'yes' branch exiting the loop.

At step 570, the processing thread turns off and stops firing the colored laser light that was used to illuminate the identified object. At step 580, this thread that was created to track and illuminate the identified object is terminated, or killed, as the object is no longer being tracked and illuminated.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
identifying, from a moving vehicle, an object proximate to a direction of the moving vehicle;
illuminating the identified object with a colored laser light, wherein the colored laser light emanates from a laser included in the vehicle;
determining whether the identified object is an animate object by detecting movement or infrared signature of the object using an animate object detector included in the vehicle;
selecting a first color to use as the colored laser light in response to determining that the identified object is animate; and
selecting a second color to use as the colored laser in response to determining that the identified object is inanimate.

2. The method of claim 1 further comprising:
illuminating the direction of the moving vehicle with a broad-spectrum headlight, wherein the illumination from the broad-spectrum headlight is broader that the illumination of the identified object with the colored laser light.

3. The method of claim 1 further comprising:
tracking the identified object with relation to the movement of the vehicle; and
changing a direction of the laser to continue illuminating the identified object based on the tracking.

4. The method of claim 3 further comprising:
continuing the tracking and the changing until a determination is made that the identified object is at a safe position from a path of the vehicle; and
terminating the illumination of the identified object in response to the determination.

5. The method of claim 1 wherein the selection of the first and second color further comprises:
directing a first laser excitation beam through a first colored phosphorous material to generate the first color in the colored laser light; and
directing a second laser excitation beam through a second colored phosphorous material to generate the second color in the colored laser light.

6. The method of claim 1 further comprising:
directing a laser excitation beam from the laser through a colored phosphorous material to generate the colored laser light.

7. A device comprising:
one or more processors;
one or more directional lasers accessible by at least one of the processors;
a memory coupled to at least one of the processors; and
a set of instructions stored in the memory and executed by at least one of the processors to:
identify, from a moving vehicle, an object proximate to a direction of the moving vehicle;
illuminate the identified object with a colored laser light, wherein the colored laser light emanates from a first laser of the one or more directional lasers;
determine whether the identified object is an animate object by detecting movement or infrared signature of the object using an animate object detector included in the vehicle;
select a first color to use in the colored laser light in response to determining that the identified object is animate; and
select a second color to use in the colored laser in response to determining that the identified object is inanimate.

8. The device of claim 7 wherein the set of instructions further comprise further instructions executed by at least one of the processors to:
illuminate the direction of the moving vehicle with a broad-spectrum headlight, wherein the illumination from the broad-spectrum headlight is broader that the illumination of the identified object with the colored laser light.

9. The device of claim 7 wherein the set of instructions further comprise further instructions executed by at least one of the processors to:
track the identified object with relation to the movement of the vehicle; and
change a direction of the laser to continue illuminating the identified object based on the tracking.

10. The device of claim 9 wherein the set of instructions further comprise further instructions executed by at least one of the processors to:
continue to track the identified object and change the direction of the laser until a determination is made that the identified object is at a safe position from a path of the vehicle; and
terminate the illumination of the identified object in response to the determination.

11. The device of claim 7 wherein the selection of the first and second color further comprises:
direct a first laser excitation beam through a first colored phosphorous material to generate the first color in the colored laser light; and
direct a second laser excitation beam through a second colored phosphorous material to generate the second color in the colored laser light.

12. The device of claim 7 wherein the set of instructions further comprise further instructions executed by at least one of the processors to:
direct a laser excitation beam from the laser through a colored phosphorous material to generate the colored laser light.

13. A computer program product comprising:
a computer readable storage medium comprising a set of computer instructions, the computer instructions effective to:
identify, from a moving vehicle, an object proximate to a direction of the moving vehicle; and illuminate the identified object with a colored laser light, wherein the colored laser light emanates from a first laser of the one or more directional lasers that are included in the vehicle;

determine whether the identified object is an animate object using an animate object detector included in the vehicle;

select a first color to use in the colored laser light in response to determining that the identified object is animate; and select a second color to use in the colored laser in response to determining that the identified object is inanimate.

14. The computer program product of claim 13 wherein the set of instructions further comprise instructions effective to:

illuminate the direction of the moving vehicle with a broad-spectrum headlight, wherein the illumination from the broad-spectrum headlight is broader that the illumination of the identified object with the colored laser light.

15. The computer program product of claim 13 wherein the set of instructions further comprise instructions effective to:

track the identified object with relation to the movement of the vehicle; and change a direction of the laser to continue illuminating the identified object based on the tracking.

16. The computer program product of claim 15 wherein the set of instructions further comprise instructions effective to:

continue to track the identified object and change the direction of the laser until a determination is made that the identified object is at a safe position from a path of the vehicle; and terminate the illumination of the identified object in response to the determination.

17. The computer program product of claim 13 wherein the selection of the first and second color further comprises:

direct a first laser excitation beam through a first colored phosphorous material to generate the first color in the colored laser light; and direct a second laser excitation beam through a second colored phosphorous material to generate the second color in the colored laser light.

18. The method of claim 1 wherein the determination of whether the identified object is an animate object using the animate object detector further comprises:

scanning the identified object with an infrared detector that distinguishes between animate objects and inanimate objects based on a received infrared signal.

19. The device of claim 7 wherein the set of instructions that determinate of whether the identified object is an animate object using the animate object detector further comprises additional instructions executed by at least one of the processors to:

scan the identified object with an infrared detector that distinguishes between animate objects and inanimate objects based on a received infrared signal.

20. The computer program product of claim 13 wherein the set of computer instructions that determinate of whether the identified object is an animate object using the animate object detector further comprises additional computer instructions to:

scan the identified object with an infrared detector that distinguishes between animate objects and inanimate objects based on a received infrared signal.

* * * * *